United States Patent
Harrison et al.

(10) Patent No.: US 9,786,133 B2
(45) Date of Patent: Oct. 10, 2017

(54) DOORBELL CHIME SYSTEMS AND METHODS

(71) Applicant: SkyBell Technologies, Inc., Irvine, CA (US)

(72) Inventors: Gregory Saul Harrison, Aliso Viejo, CA (US); Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 15/008,366

(22) Filed: Jan. 27, 2016

(65) Prior Publication Data

US 2017/0084131 A1  Mar. 23, 2017

Related U.S. Application Data

(63) Continuation-in-part of application No. 14/861,613, filed on Sep. 22, 2015.

(60) Provisional application No. 62/260,508, filed on Nov. 28, 2015.

(51) Int. Cl.
*H04N 9/47* (2006.01)
*H04N 7/18* (2006.01)
(Continued)

(52) U.S. Cl.
CPC ............ *G08B 3/10* (2013.01); *H04L 12/2818* (2013.01); *H04M 11/025* (2013.01); *H04N 7/186* (2013.01); *G08B 7/064* (2013.01); *G08B 15/00* (2013.01); *G08B 25/009* (2013.01); *H04L 12/2803* (2013.01); *H04L 2012/2841* (2013.01); *H04L 2012/2849* (2013.01)

(58) Field of Classification Search
CPC ........ G05B 2219/2642; H04M 11/025; H04M 1/0291; H04M 11/00; G08B 17/10; G08B 21/06; G08B 15/002; G08B 19/00; G08B 19/005; G08B 21/02; G08B 21/04; H04L 12/2803; H04L 12/28; A61B 5/681; A61B 5/4812; A61B 5/4806
USPC ........................................................ 348/148
See application file for complete search history.

(56) References Cited

U.S. PATENT DOCUMENTS

| 3,708,742 A | 1/1973 | Gunn |
| 4,523,193 A | 6/1985 | Levinson |

(Continued)

FOREIGN PATENT DOCUMENTS

| CN | 1902609 | 5/2010 |
| CN | 202872976 | 4/2013 |

(Continued)

OTHER PUBLICATIONS

Doorbot—Downloaded on Nov. 18, 2013 from http://www.craigncompany.com/home-tech-doorbot/; prior art publication at least as of Jun. 10, 2013.

(Continued)

*Primary Examiner* — Jared Walker

(57) ABSTRACT

Methods for using a doorbell chime system can include detecting, by a sleep detection system, that a person is asleep; receiving a first signal, by the doorbell or the doorbell chime, in response to the sleep detection system detecting that the person is asleep; and blocking the doorbell chime from emitting a first notification sound in response to detecting, by the sleep detection system, that the person is asleep.

21 Claims, 12 Drawing Sheets

(51) Int. Cl.
  *G08B 3/10* (2006.01)
  *H04M 11/02* (2006.01)
  *G08B 7/06* (2006.01)
  *G08B 15/00* (2006.01)
  *G08B 25/00* (2006.01)
  *H04L 12/28* (2006.01)

(56) References Cited

U.S. PATENT DOCUMENTS

| | | |
|---|---|---|
| D283,130 S | 3/1986 | Boenning |
| D297,222 S | 8/1988 | Rauch |
| 4,843,461 A | 6/1989 | Tatsumi |
| 5,210,520 A | 5/1993 | Housley |
| 5,428,388 A | 6/1995 | Von Bauer |
| 5,493,618 A | 2/1996 | Stevens |
| 5,521,578 A | 5/1996 | DelValle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,752,070 B2 | 7/2010 | Hatcher |
| 7,956,576 B2 | 6/2011 | Neu |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 2001/0022627 A1 | 9/2001 | Bernhardt |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0071879 A1 | 3/2005 | Haldavnekar |
| 2005/0097248 A1 | 5/2005 | Kelley |
| 2005/0116480 A1 | 6/2005 | Deng |
| 2005/0267605 A1 | 12/2005 | Lee |
| 2005/0285934 A1 | 12/2005 | Carter |
| 2005/0285944 A1 | 12/2005 | Wantanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0008081 A1 | 1/2007 | Tylicki |
| 2007/0046442 A1 | 3/2007 | Bartorelli |
| 2007/0109441 A1 | 5/2007 | Cheng |
| 2007/0126574 A1 | 6/2007 | Langer |
| 2007/0146115 A1 | 6/2007 | Roosli |
| 2007/0194945 A1 | 8/2007 | Atkinson |
| 2007/0216764 A1 | 9/2007 | Kwak |
| 2008/0036862 A1 | 2/2008 | Lang |
| 2008/0128586 A1 | 6/2008 | Johnson |
| 2008/0157956 A1* | 7/2008 | Radivojevic ............ A61B 5/11 340/531 |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0207249 A1 | 8/2009 | Erel |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0245060 A1 | 9/2010 | Tylicki |
| 2010/0276570 A1 | 11/2010 | Moser |
| 2011/0025852 A1 | 2/2011 | Tanaka |
| 2011/0121940 A1 | 5/2011 | Jones |
| 2011/0156566 A1 | 6/2011 | Chen |
| 2011/0207509 A1 | 8/2011 | Crawford |
| 2011/0287718 A1 | 11/2011 | Abel |
| 2012/0011559 A1 | 1/2012 | Miettinen |

(56) References Cited

U.S. PATENT DOCUMENTS

| | | |
|---|---|---|
| 2012/0027248 A1 | 2/2012 | Feris |
| 2012/0044049 A1 | 2/2012 | Vig |
| 2012/0044050 A1 | 2/2012 | Vig |
| 2012/0044085 A1 | 2/2012 | Hung |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327225 A1 | 12/2012 | Barley |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0009609 A1 | 1/2014 | Webster |
| 2014/0015967 A1 | 1/2014 | Moore |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2014/0260449 A1 | 9/2014 | Uyeda |
| 2014/0266669 A1 | 9/2014 | Fadell |
| 2014/0267716 A1 | 9/2014 | Child |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0145991 A1 | 5/2015 | Russell |
| 2015/0156031 A1 | 6/2015 | Fadell |
| 2015/0194839 A1 | 7/2015 | Wojcik |

FOREIGN PATENT DOCUMENTS

| | | |
|---|---|---|
| CN | 202939738 | 5/2013 |
| EP | 684743 | 7/1999 |
| GB | 2400958 | 12/2005 |
| WO | 01/93220 | 12/2001 |
| WO | WO2007111802 | 10/2007 |

OTHER PUBLICATIONS

Doorbot—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.

Doorbot—Downloaded on Nov. 18, 2013 from http://www.digitaltrends.com/lifestyle/doorbot-camera-see-visitors-smartphone/; prior art publication at least as of Dec. 9, 2012.

Doorbot website—Downloaded on Nov. 18, 2013 from http://www.getdoorbot.com/.

Doorbot users manual—Downloaded on Nov. 18, 2013 from http://static.mydoorbot.com/DoorBot%20Users%20Manual%201.0.pdf.

Doorbot "fact sheet"—Downloaded on Nov. 18, 2013 from http://cdn.shopify.com/s/files/1/0247/6501/files/DoorBotMediaKit.pdf?17037.

Doorbot "features kit"—Downloaded on Nov. 18, 2013 from http://cdn.shopify.com/s/files/1/0247/6501/files/DoorBot_Features_Kit.pdf?17037.

CellNock index page—Originally downloaded on Sep. 23, 2013 from http://cellnock.com/index.html; the website says CellNock is "patent pending".

CellNock about founder page—downloaded on Nov. 18, 2013 from http://cellnock.com/index.html; the website says CellNock is "patent pending".

CellNock learn more page—Downloaded on Nov. 18, 2013 from http://cellnock.com/learn_more.htm; the website says CellNock is "patent pending".

CellNock product page—Downloaded on Nov. 18, 2013 from http://cellnock.com/products.htm; the website says CellNock is "patent pending".

Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.

MySkyBell.com—Part 1 (previously iDoorCam.com)—Downloaded on Nov. 18, 2013 from http://www.myskybell.com/.

MySkyBell.com—Part 2 (previously iDoorCam.com)—Downloaded on Nov. 18, 2013 from http://www.myskybell.com/.

MySkyBell.com—Part 3 (previously iDoorCam.com)—Downloaded on Nov. 18, 2013 from http://www.myskybell.com/.

MySkyBell.com—Part 4 (previously iDoorCam.com)—Downloaded on Nov. 18, 2013 from http://www.myskybell.com/.

MySkyBell.com—Part 5 (previously iDoorCam.com)—Downloaded on Nov. 18, 2013 from http://www.myskybell.com/.

Squaritz IDS Doorbell System—Downloaded on Aug. 15, 2013 from http://www.indiegogo.com/projects/squaritz-ids-intelligent-doorbell-system.

MyBells—Downloaded on Nov. 18, 2013 from http://www.indiegogo.com/projects/mybells-the-smart-bells.

Wireless video doorbell pager—Downloaded on Aug. 9, 2013 from http://www.indiegogo.com/projects/wireless-video-doorbell-pager-4.

Lockitron—Downloaded on Jul. 24, 2013 from https://lockitron.com/preorder.

EyeTalk for home—Downloaded on May 24, 2013 from http://www.revolutionaryconceptsinc.com/forhome.html.

EyeTalk Product—Downloaded on Nov. 18, 2013 from http://www.revolutionaryconceptsinc.com/eyetalk.html.

Langer Doorbell Light—Downloaded on Nov. 18, 2013 from http://www.youtube.com/watch?v=u9nNCm4tSYI; published at least as early as Apr. 2013.

SmartBell—Downloaded on Dec. 5, 2013 from http://smartbell.co/This_is_smartbell.html.

SmartBell—Downloaded on Dec. 5, 2013 from http://smartbell.co/Tech_specs.html.

SmartBell—Downloaded on Dec. 5, 2013 from http://smartbell.co/FAQ.html.

SmartBell—A Doorbell for Smartphones, published by Scrambled Brains Tech, LLC., Oct. 1, 2013.

August Smart Lock—Part 1—Downloaded on Jun. 10, 2014 from www.August.com.

August Smart Lock—Part 2—Downloaded on Jun. 10, 2014 from www.August.com.

August Smart Lock—Part 3—Downloaded on Oct. 10, 2014 from www.August.com.

Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.

(56) References Cited

OTHER PUBLICATIONS

Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/19119517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
Chime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.
iDoorCam—A Wi-Fi Enabled, Webcam Doorbell—Downloaded on Sep. 3, 2013 from http://www.idoorcam.com/.
Sguaritz IDS—Intelligent Doorbell System—Downloaded on Aug. 15, 2013 from http://www.indiegogo.com/projects/squaritz-ids-intelligent-doorbell-system.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v =u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstartercom/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Plafform.
MyInterCom Video System—Downloaded on Jun. 8, 2015 from http://myintercom.de/en/funktionsweise.
Kochhi's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.
Mimo Monitors—Online prior to Jan. 1, 2016 at mimobaby.com/product.
Sproutling Baby Monitors—Online prior to Jan. 1, 2016 at spectrum.ieee.org/geek-life/tools-toys/review/the-sproutling-baby-monitor.
Angelcare AC1100 Monitor—Online prior to Jan. 1, 2016 at angelcarebaby.com/item/usa-best-video-monitor-with-sensor-pad-ac1100/#.VxUyyvnythE.
Owlet Monitor—Online prior to Jan. 1, 2016 at owletcare.com/how-it-works.

\* cited by examiner

DOORBELL CHIME SYSTEMS AND METHODS

CROSS-REFERENCE TO RELATED APPLICATIONS

The entire contents of the following application are incorporated by reference herein: U.S. Provisional Patent Application No. 62/260,508; filed Nov. 28, 2015; and entitled DOORBELL CHIME SYSTEMS AND METHODS.

The entire contents of the following application are incorporated by reference herein: U.S. Nonprovisional patent application Ser. No. 14/861,613; filed Sep. 22, 2015; and entitled DOORBELL COMMUNICATION SYSTEMS AND METHODS.

The entire contents of the following application are incorporated by reference herein: U.S. Provisional Patent Application No. 62/158,750; filed May 8, 2015; and entitled DOORBELL COMMUNICATION SYSTEMS AND METHODS.

The entire contents of the following applications are incorporated by reference herein: U.S. Nonprovisional patent application Ser. No. 14/612,376; filed Feb. 3, 2015; and entitled DOORBELL COMMUNICATION SYSTEMS AND METHODS; U.S. Nonprovisional patent application Ser. No. 14/502,601; filed Sep. 30, 2014; and entitled DOORBELL COMMUNICATION SYSTEMS AND METHODS; U.S. Nonprovisional patent application Ser. No. 14/492,809; filed Sep. 22, 2014; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

Field

Various embodiments disclosed herein relate to doorbells. Certain embodiments relate to doorbell communication systems that include chimes.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

A doorbell chime can be communicatively coupled with a doorbell while the chime is located remotely relative to the doorbell. For example, the doorbell can be coupled to an exterior surface of a building (e.g., near an entryway) and the chime can be coupled to an interior surface of a building. In some cases, chimes can emit unwanted alerting sounds. Thus, there is a need for systems that enable chimes to emit wanted alerting sounds while preventing chimes from emitting unwanted alerting sounds.

SUMMARY

In several embodiments, methods may include using a doorbell chime system. Doorbell chime systems may include an electronic monitor and a transceiver. The methods may comprise detecting, by an electronic monitor, that a person is asleep and receiving a first signal, by a transceiver, in response to the electronic monitor detecting that the person is asleep. Methods may include modifying a notification sound emitted by a doorbell chime in response to detecting, by the electronic monitor, that the person is asleep.

Some embodiments may include detecting, by the electronic monitor, that the person is awake and receiving a second signal, by the transceiver, in response to the electronic monitor detecting that the person is awake. Methods may include modifying the notification sound emitted by the doorbell chime in response to detecting, by the electronic monitor, that the person is awake. Modifying the notification sound emitted by the doorbell chime may include increasing the volume of the notification sound. Modifying the notification sound emitted by the doorbell chime may comprise enabling the notification sound. Modifying the notification sound emitted by the doorbell chime may comprise decreasing the volume of the notification sound. Modifying the notification sound emitted by the doorbell chime may comprise blocking the notification sound.

Some embodiments may include one or more of the following features. The transceiver may be the doorbell chime, the doorbell, or a communication hub. Modifying the notification sound emitted by the doorbell chime may comprise: sending, by the doorbell, a modifying signal to the doorbell chime in response to the doorbell receiving the first signal, and blocking, by the doorbell chime, the notification sound in response to receiving the modifying signal. Modifying the notification sound emitted by the doorbell chime may comprise: sending, by the communication hub, a modifying signal to the doorbell chime in response to the communication hub receiving the first signal and blocking, by the doorbell chime, the notification sound in response to receiving the modifying signal. The electronic monitor may be a camera, an activity tracker, a motion detector, or an under-mattress monitor.

In several embodiments a doorbell system may include a doorbell chime configured to emit a notification sound in response to receiving a visitor indication from a doorbell and a sleep detection system having a sensor configured to determine whether a person is asleep. The doorbell, the doorbell chime, and the sleep detection system may be communicatively coupled such that the doorbell system, in response to the sleep detection system determining that the person is asleep, may be configured to modify the notification sound emitted by the doorbell chime.

Some embodiments may include one or more of the following features. The doorbell chime system may include a communication hub. The doorbell, doorbell chime, and the sleep detection system may be communicatively coupled to the communication hub. The doorbell system may, in response to the sleep detection system determining that the person is awake, be configured to modify the notification sound emitted by the doorbell chime.

In several embodiments may include a doorbell chime configured to emit a notification sound in response to receiving a visitor indication from a doorbell; and a sleep detection system. The sleep detection system may have a sensor configured to determine whether a person is asleep. The doorbell chime and the sleep detection system may be communicatively coupled to a transceiver such that the doorbell system, in response to the sleep detection system determining that the person is asleep, is configured to modify the notification sound emitted by the doorbell chime.

Some embodiments may include one or more of the following features. The doorbell system may be configured to, in response to the sleep detection system determining that the person is awake, modify the notification sound emitted by the doorbell chime. Modifying the notification sound emitted by the doorbell chime may include enabling the notification sound or increasing the volume of the notification sound. The transceiver may be, among other things, a communication hub, a doorbell, or a doorbell chime. Modifying the notification sound emitted by the doorbell chime may include blocking the notification sound or decreasing the volume of the notification sound.

Methods for using a doorbell chime system can include detecting, by an electronic monitor, that a person is asleep; receiving a first signal, by the doorbell chime, in response to the electronic monitor detecting that the person is asleep; and blocking the doorbell chime from emitting a first notification sound in response to detecting, by the electronic monitor, that the person is asleep.

Some embodiments include reducing a volume of the chime in response to detecting, by a sleep detection system, an indication that the person is asleep. Several embodiments include reducing a volume of the chime in response to detecting, by a sleep detection system, an indication that the person is located in a sleeping area such as a bed or a crib.

In some embodiments, the sleep detection system communicates directly with the chime via wireless communication. In several embodiments, the chime receives a signal from another device (e.g., a hub, a doorbell) in response to the other device receiving a signal from the sleep detection system. The sleep detection system can send the signal to the other device in response to detecting an indication that the person is asleep.

The chime can receive a second signal to permit the chime to emit notification sounds and/or increase the volume of notification sounds in response to the sleep detection system detecting that the person is no longer asleep (e.g., the person is no longer located in a sleeping area and/or is no longer exhibiting indications of sleep).

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
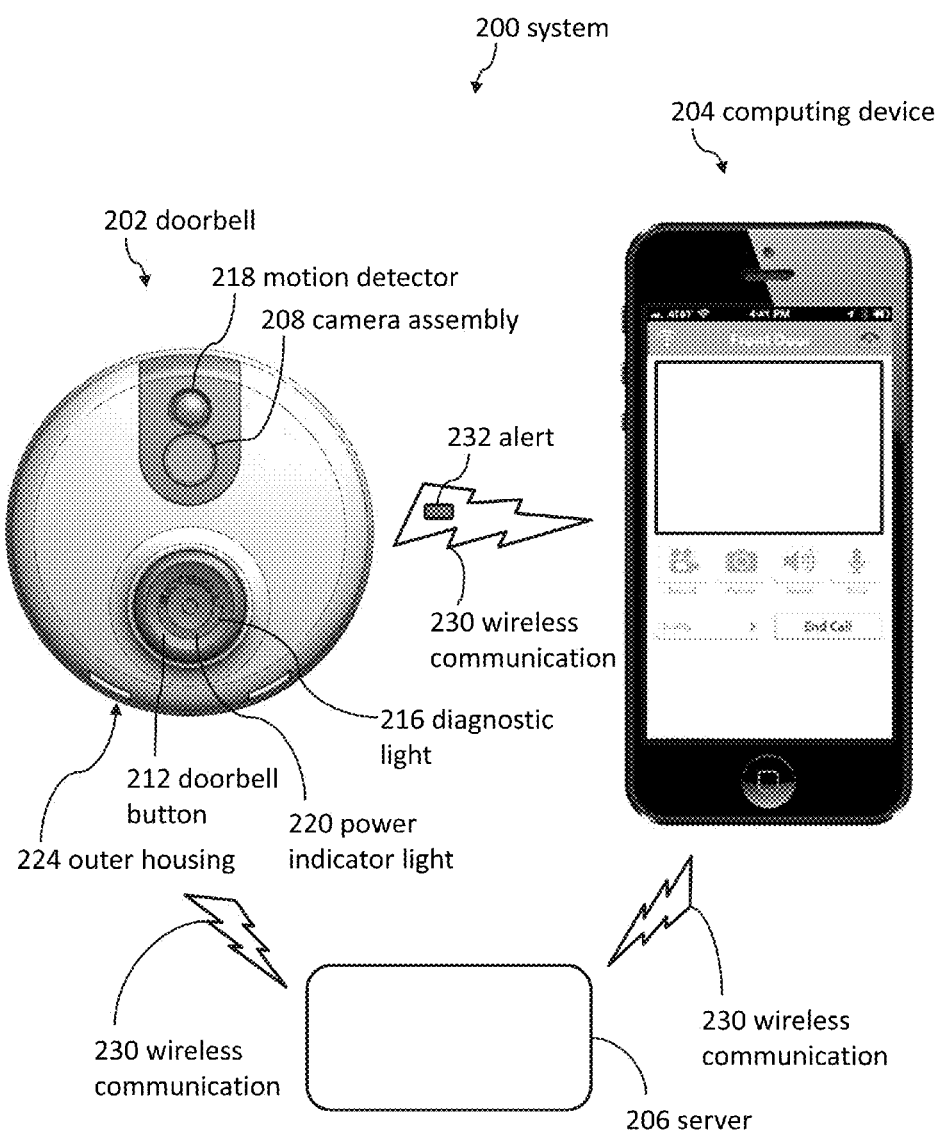
FIG. 1 illustrates a front view of a doorbell system, according to some embodiments.

Referring now to FIG. 1, the doorbell 202 can record video and audio, which can then be sent to a remote computing device 204. The remote computing device 204 displays the video and emits the audio from the doorbell 202 to enable a user of the remote computing device 204 to see and hear a visitor. For example, when the doorbell 202 detects a visitor (e.g., a motion sensor 218 detects a visitor or the visitor presses the button 212), the doorbell 202 can send a push notification to the remote computing device 204. A user of the remote computing device 204 can then see and hear the visitor.

The user of the remote computing device 204 can select a button on application software running on the remote computing device 204 to initiate two-way audio and/or video communication with the visitor. In some embodiments, the user can see and hear the visitor, and the visitor can hear (but not see the user). In several embodiments, the user can hear (but not see) the visitor. In some embodiments, the user and visitor can both see and hear each other (e.g., the doorbell 202 can include a display screen to show live video captured by a camera of the remote computing device 204).

Doorbell systems can be a portion of a smart home hub. In some embodiments, the doorbell system 200 forms the core of the smart home hub. For example, the various systems described herein enable complete home automation. In some embodiments, the doorbell 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the doorbell 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The doorbell system 200 can include a doorbell 202 (e.g., a security system) and a computing device 204. Although the illustrated doorbell 202 includes many components in one housing, several doorbell embodiments include components in separate housings. The doorbell 202 can include a camera assembly 208 and a doorbell button 212. The camera assembly 208 can include a video camera, which in some embodiments is a webcam. The doorbell 202 can include a diagnostic light 216 and a power indicator light 220. In some embodiments, the diagnostic light 216 is a first color (e.g., blue) if the doorbell 202 and/or the doorbell system 200 is connected to a wireless Internet network and is a second color (e.g., red) if the doorbell 202 and/or the doorbell system 200 is not connected to a wireless Internet network. In some embodiments, the power indicator 220 is a first color if the doorbell 202 is connected to a power source. The power source can be supplied by the building to which the doorbell 202 is attached. In some embodiments, the power indicator 220 is a second color or does not emit light if the doorbell 202 is not connected to the power source.

The doorbell 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The doorbell 202 can be electrically coupled to a power source, such as wires electrically connected to a building's electrical power system. In some embodiments, the doorbell 202 includes a battery for backup and/or primary power.

Wireless communication 230 can enable the doorbell 202 to communicate with the computing device 204. Some embodiments enable communication via cellular and/or WiFi networks. Some embodiments enable communication via the Internet. Several embodiments enable wired communication between the doorbell 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the doorbell 202 can initiate voice calls or send text messages to a computing device 204 (e.g., a smartphone, a desktop computer, a tablet computer, a laptop computer).

Several embodiments use near field communication (NFC) to communicate between the computing device 204 and the doorbell 202. The doorbell 202 and/or the computing device 204 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
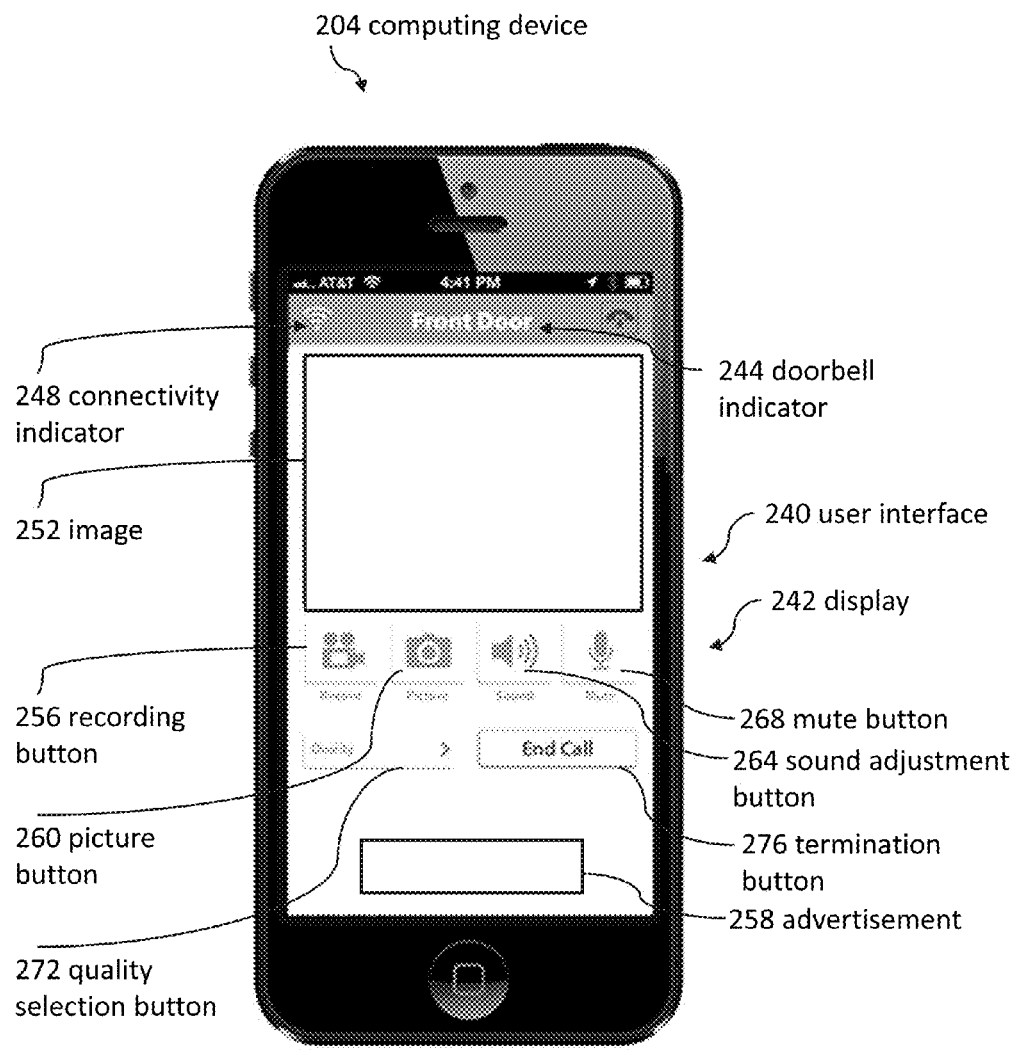
FIG. 2 illustrates a front view of a computing device running software to communicate with the doorbell from FIG. 1, according to some embodiments.

FIG. 2 illustrates a computing device 204 running software. The software includes a user interface 240 displayed on a display screen 242. The user interface 240 can include a doorbell indicator 244, which can indicate the location of the doorbell that the user interface is displaying. For example, a person can use one computing device 204 to control and/or interact with multiple doorbells, such as one doorbell located at a front door and another doorbell located at a back door. Selecting the doorbell indicator 244 can allow the user to choose another doorbell (e.g., a doorbell located by a back door rather than a doorbell located by a front door).

The user interface 240 can include a connectivity indicator 248. In some embodiments, the connectivity indicator 248 can indicate whether the computing device is in communication with a doorbell, the Internet, and/or a cellular network. The connectivity indicator 248 can alert the user if the computing device 204 has lost its connection with the doorbell 202; the doorbell 202 has been damaged; the doorbell 202 has been stolen; the doorbell 202 has been removed from its mounting location; the doorbell 202 has lost electrical power; and/or if the computing device 204 cannot communicate with the doorbell 202. In some embodiments, the connectivity indicator 248 alerts the user of the computing device 204 by flashing, emitting a sound, displaying a message, and/or displaying a symbol.

In some embodiments, if the doorbell 202 loses power, loses connectivity to the computing device 204, loses connectivity to the Internet, and/or loses connectivity to a remote server, a remote server 206 sends an alert 232 (e.g., phone call, text message, image on the user interface 240) regarding the power and/or connectivity issue. In several embodiments, the remote server 206 can manage communication between the doorbell 202 and the computing device 204. In some embodiments, information from the doorbell 202 is stored by the remote server 206. In several embodiments, information from the doorbell 202 is stored by the remote server 206 until the information can be sent to the computing device 204, uploaded to the computing device 204, and/or displayed to the remotely located person via the computing device 204. The remote server 206 can be a computing device that stores information from the doorbell 202 and/or from the computing device 204. In some embodiments, the remote server 206 is located in a data center.

In some embodiments, the computing device 204 and/or the remote server 206 attempts to communicate with the doorbell 202. If the computing device 204 and/or the remote server 206 is unable to communicate with the doorbell 202, the computing device 204 and/or the remote server 206 alerts the remotely located person via the software, phone, text, a displayed message, and/or a website. In some embodiments, the computing device 204 and/or the remote server 206 attempts to communicate with the doorbell 202 periodically; at least every five hours and/or less than every 10 minutes; at least every 24 hours and/or less than every 60 minutes; or at least every hour and/or less than every second.

In some embodiments, the server 206 can initiate communication with the computing device 204 and/or with the doorbell 202. In several embodiments, the server 206 can initiate, control, and/or block communication between the computing device 204 and the doorbell 202.

In several embodiments, a user can log in to an "app," website, and/or software on a computing device (e.g., mobile computing device, smartphone, tablet, desktop computer) to adjust the doorbell settings discussed herein.

In some embodiments, a computing device can enable a user to watch live video and/or hear live audio from a doorbell due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the doorbell 202. The image 252 can be taken by the camera assembly 208 and stored by the doorbell 202, server 206, and/or computing device 204. The user interface 240 can include a recording button 256 to enable a user to record images, videos, and/or sound from the camera assembly 208, microphone of the doorbell 202, and/or microphone of the computing device 204.

In several embodiments, the user interface 240 includes a picture button 260 to allow the user to take still pictures and/or videos of the area near and/or in front of the doorbell 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the doorbell 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button 272, which can allow a user to select the quality and/or amount of the data transmitted from the doorbell 202 to the computing device 204 and/or from the computing device 204 to the doorbell 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the doorbell 202 and the computing device 204. In some embodiments, the termination button 276 ends the ability of the person located near the doorbell 202 (i.e., the visitor) to hear and/or see the user of the computing device 204, but does not end the ability of the user of the computing device 204 to hear and/or see the person located near the doorbell 202.

In some embodiments, a button 276 is both an answer button (to accept a communication request from a visitor) and a termination button (to end communication between the doorbell 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the doorbell and to stop emitting sounds recorded by the doorbell.

In some embodiments, the user interface 240 opens as soon as the doorbell detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a doorbell. The methods can include causing the user interface to display on a remote computing device 204 due to the detection of the visitor (e.g., with or without user interaction). The methods can include displaying video from the doorbell and/or audio from the doorbell before the user accepts two-way communication with the visitor. The methods can include displaying video from the doorbell and/or audio from the doorbell before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the doorbell before opening a means of two-way communication with the visitor.

In some embodiments, the software includes means to start the video feed on demand. For example, a user of the computing device might wonder what is happening near the doorbell 202. The user can open the software application on the computing device 204 and instruct the application to show live video and/or audio from the security device 202 even if no event near the doorbell 202 has triggered the communication.

In several embodiments, the security device 202 can be configured to record when the security device 202 detects movement and/or the presence of a person. The user of the computing device 204 can later review all video and/or audio records from when the security device 202 detected movement and/or the presence of a person.

Referring now to FIG. 1, in some embodiments, the server 206 controls communication between the computing device 204 and the doorbell 202, which can be a doorbell with a camera, a microphone, and a speaker. In several embodiments, the server 206 does not control communication between the computing device 204 and the doorbell 202.

In some embodiments, data captured by the doorbell and/or the computing device 204 (such as videos, pictures, and audio) is stored by another remote device such as the server 206. Cloud storage, enterprise storage, and/or networked enterprise storage can be used to store video, pictures, and/or audio from the doorbell system 200 or from any part of the doorbell system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the doorbell 202 can store information and statistics regarding visitors and usage.

Figure 3:
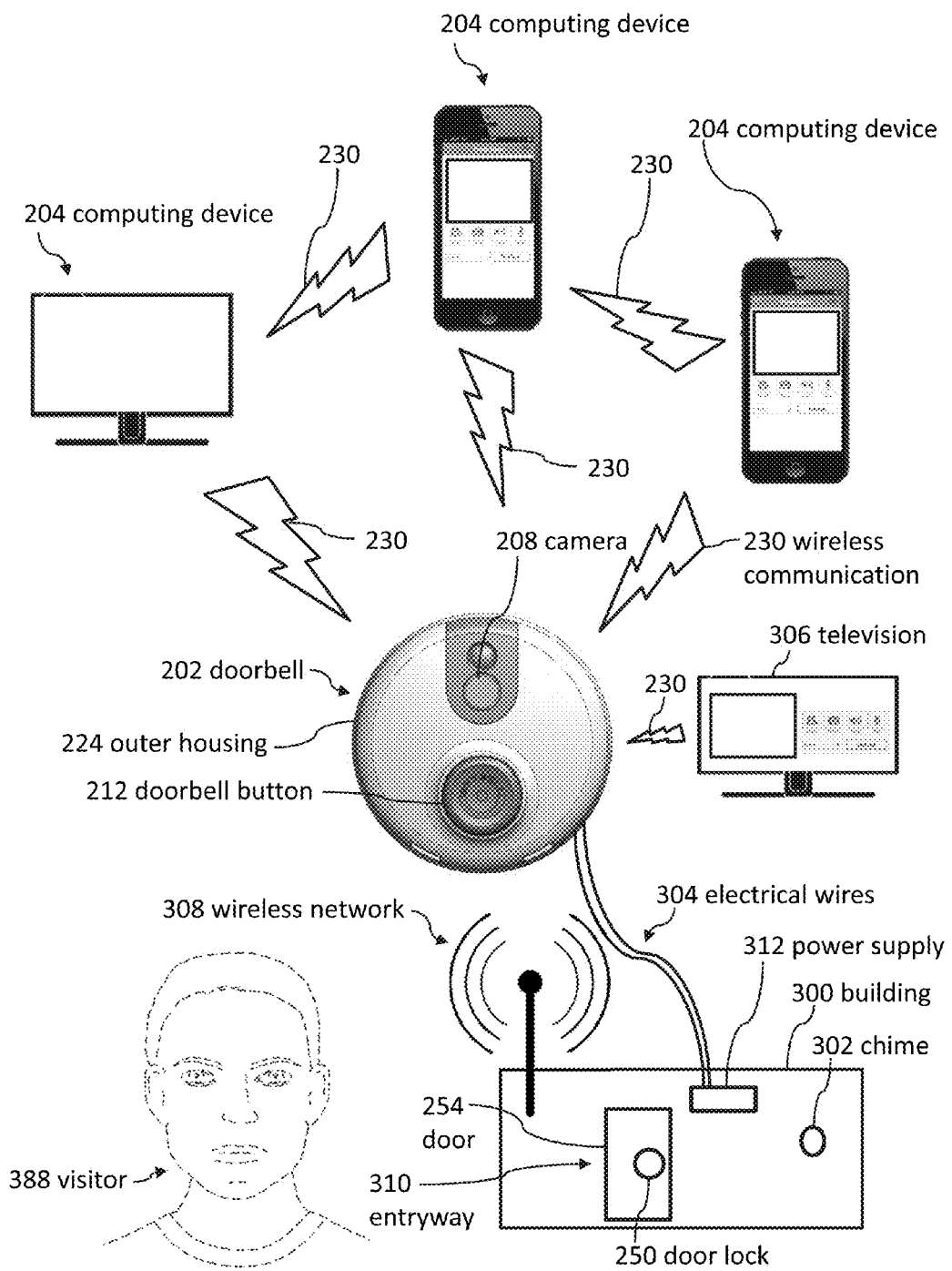
FIG. 3 illustrates a diagrammatic view of an embodiment in which the doorbell from FIG. 1 is connected to a building, according to some embodiments.

FIG. 3 illustrates an embodiment in which a doorbell 202 is connected to a building 300, which can include an entryway 310 that has a door 254. A visitor 388 can approach the doorbell 202 and then can be detected by the doorbell 202. The visitor 388 can press the doorbell button 212. The user of the doorbell 202 can configure the doorbell 202 such that when the visitor 388 presses the doorbell button 212, the user receives a notification regarding the visitor 388.

Electrical wires 304 can electrically couple the doorbell 202 to the electrical system 312 of the building 300 such that the doorbell 202 can receive electrical power from the building 300. The building can include a door lock 250 to lock the door 254.

A wireless network 308 can allow devices to wirelessly access the Internet. The doorbell 202 can access the Internet via the wireless network 308. The wireless network 308 can transmit data from the doorbell 202 to the Internet, which can transmit the data to remotely located computing devices 204. The Internet and wireless networks can transmit data from remotely located computing devices 204 to the doorbell 202. In some embodiments, a doorbell 202 connects to a home's WiFi.

As illustrated in FIG. 3, multiple computing devices 204 can communicate with one doorbell 202. In some embodiments, one computing device 204 (e.g., a laptop, a smartphone, a mobile computing device, a television) can communicate with multiple doorbells 202.

In some embodiments, the doorbell 202 can communicate (e.g., wirelessly 230) with a television 306, which can be a smart television. Users can view the television 306 to see a visitor and/or talk with the visitor.

Figure 4:
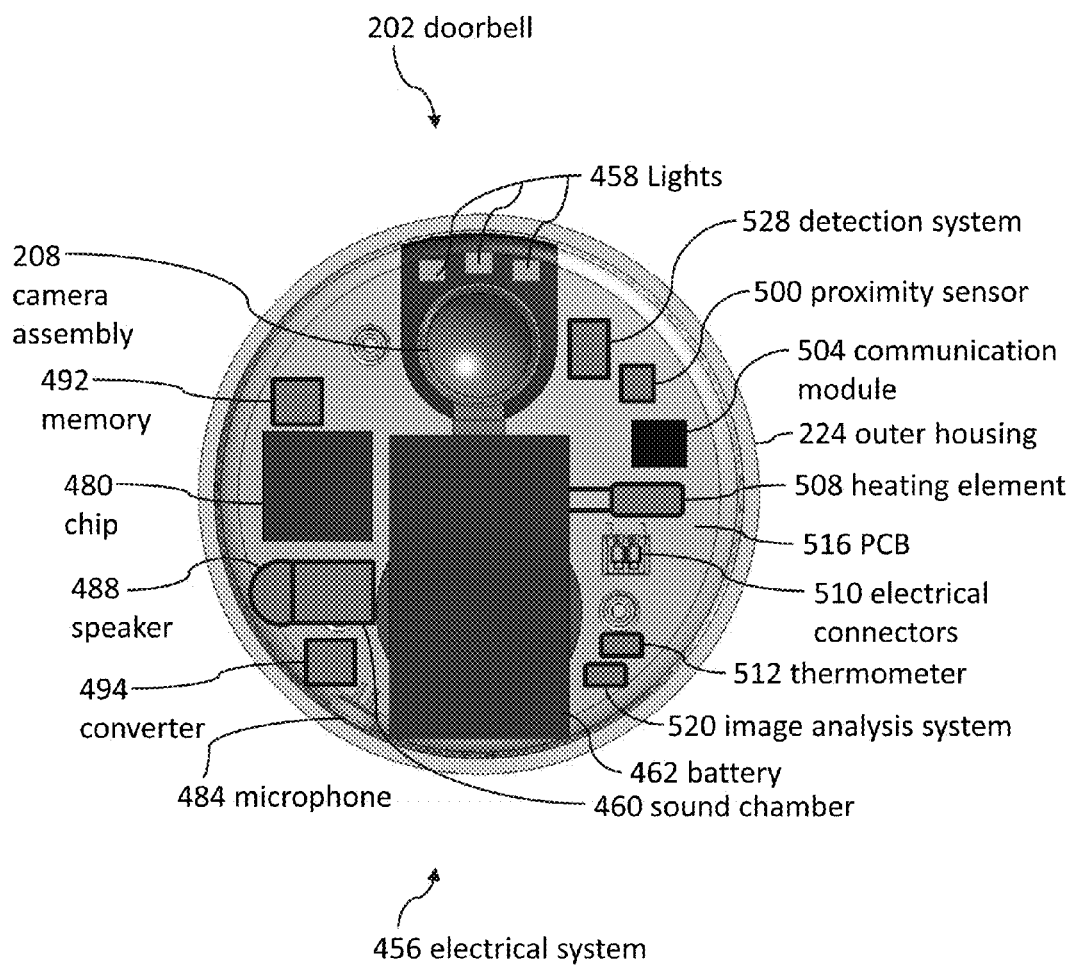
FIG. 4 illustrates a back view of the doorbell from FIG. 1 without a mounting bracket, according to some embodiments.
Figure 5:
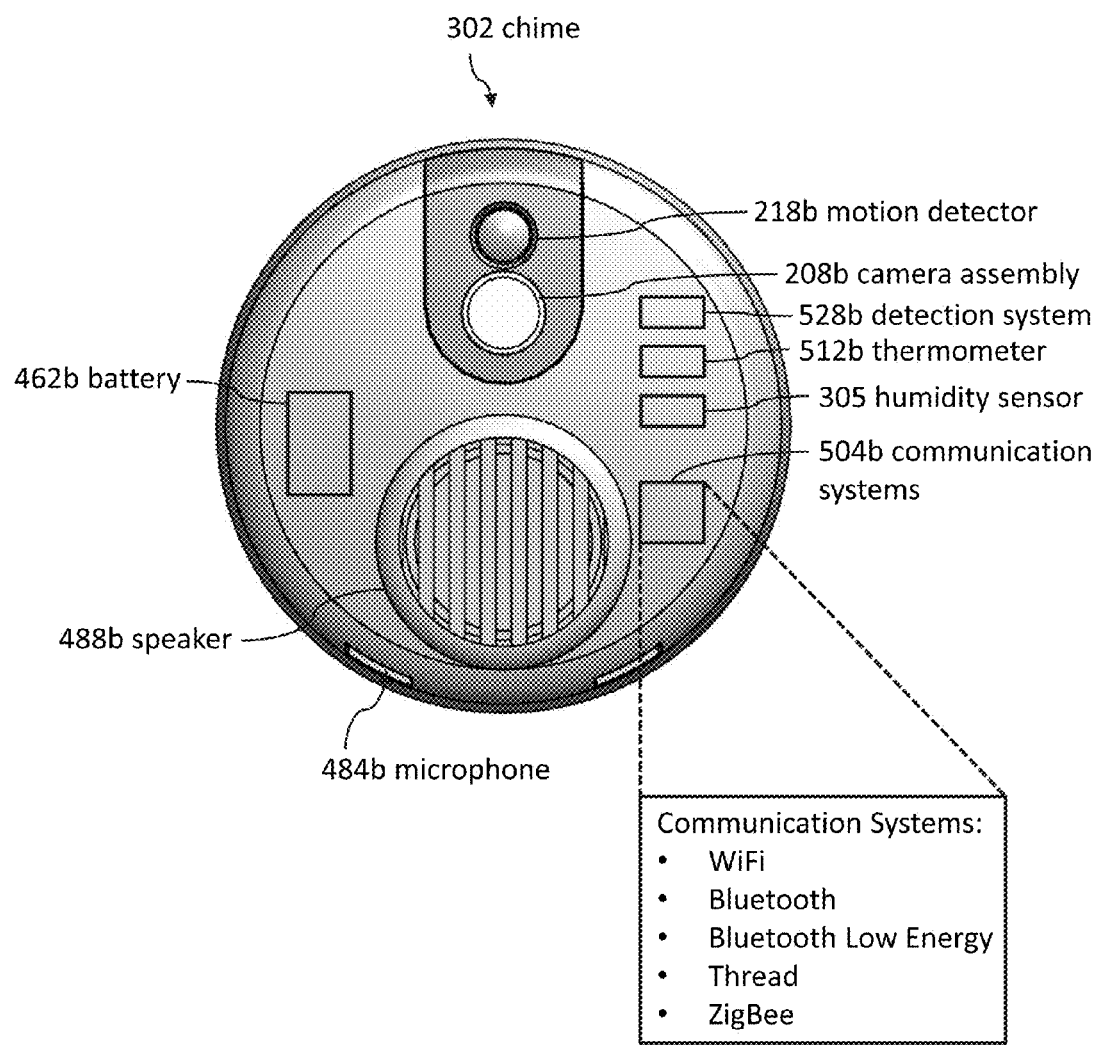
FIG. 5 illustrates a front view of a doorbell chime, according to some embodiments.
Figure 6:
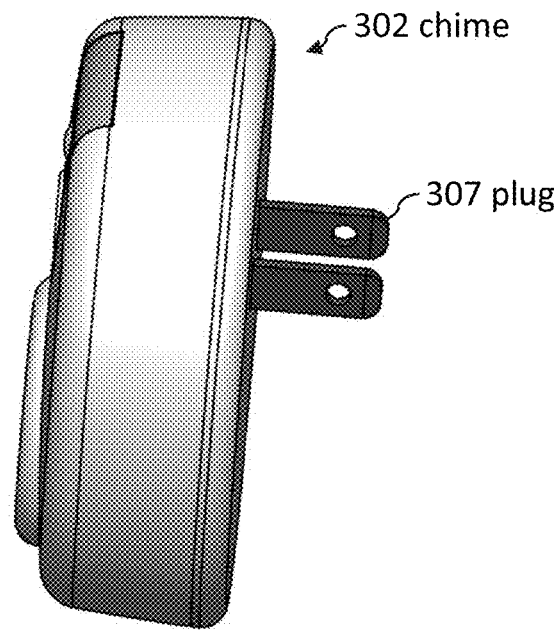
FIG. 6 illustrates a side perspective view of a doorbell chime, according to some embodiments.
Figure 7:
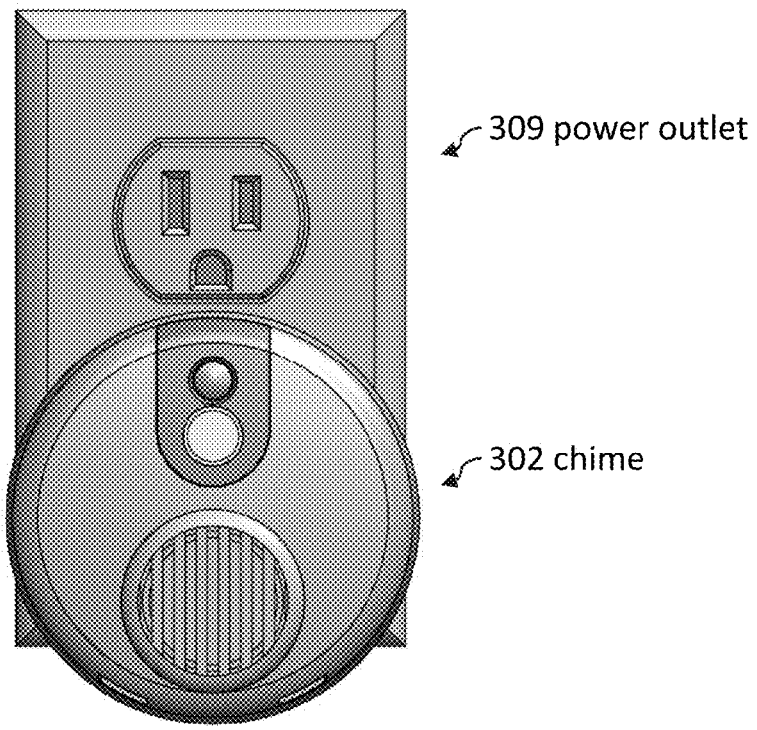
FIG. 7 illustrates a front view of a doorbell chime coupled to a power outlet, according to some embodiments.
Figure 8:
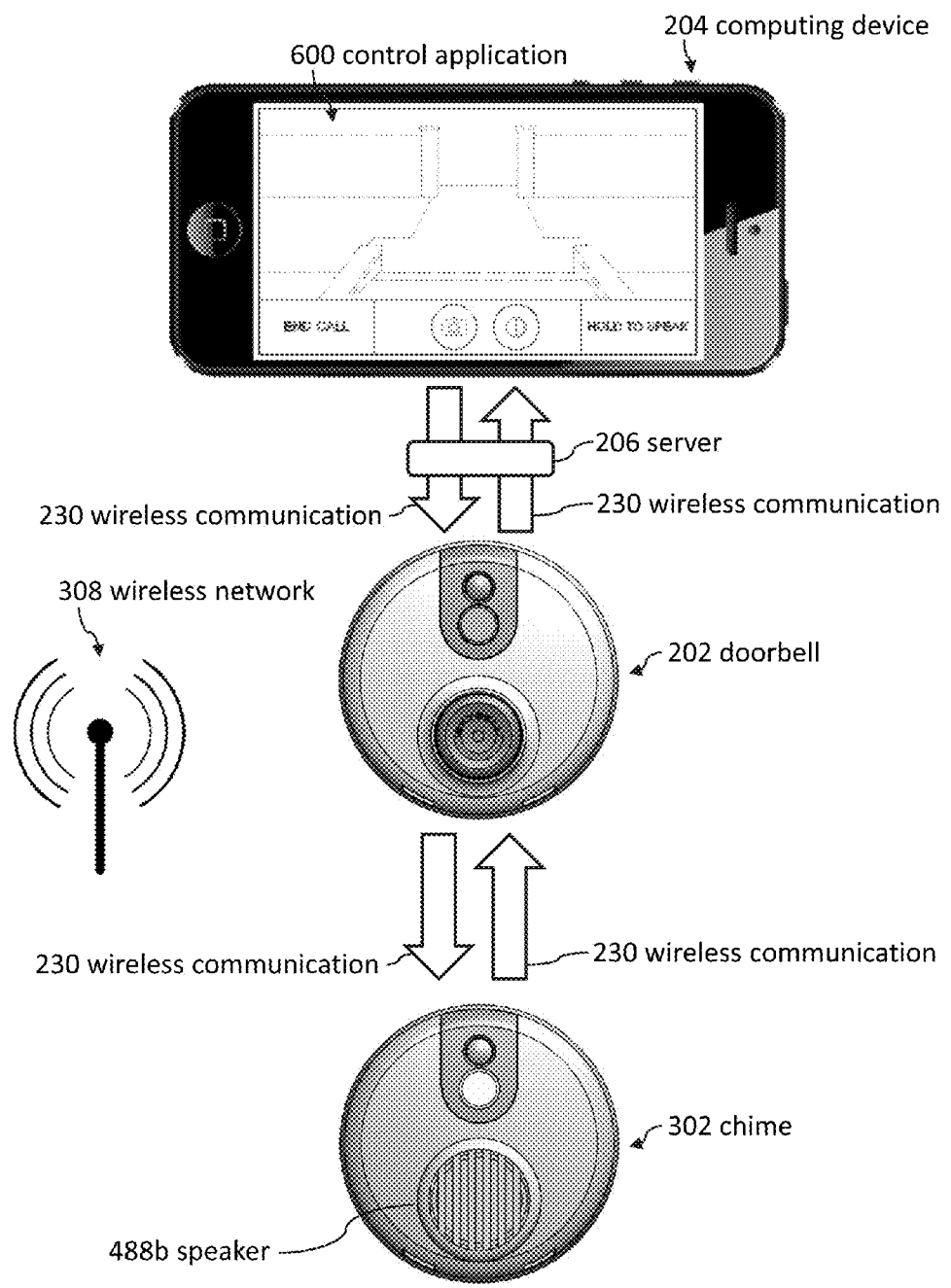
FIGS. 8, 9, and 10 illustrate diagrammatic views view of doorbell systems, according to some embodiments.
Figure 9:
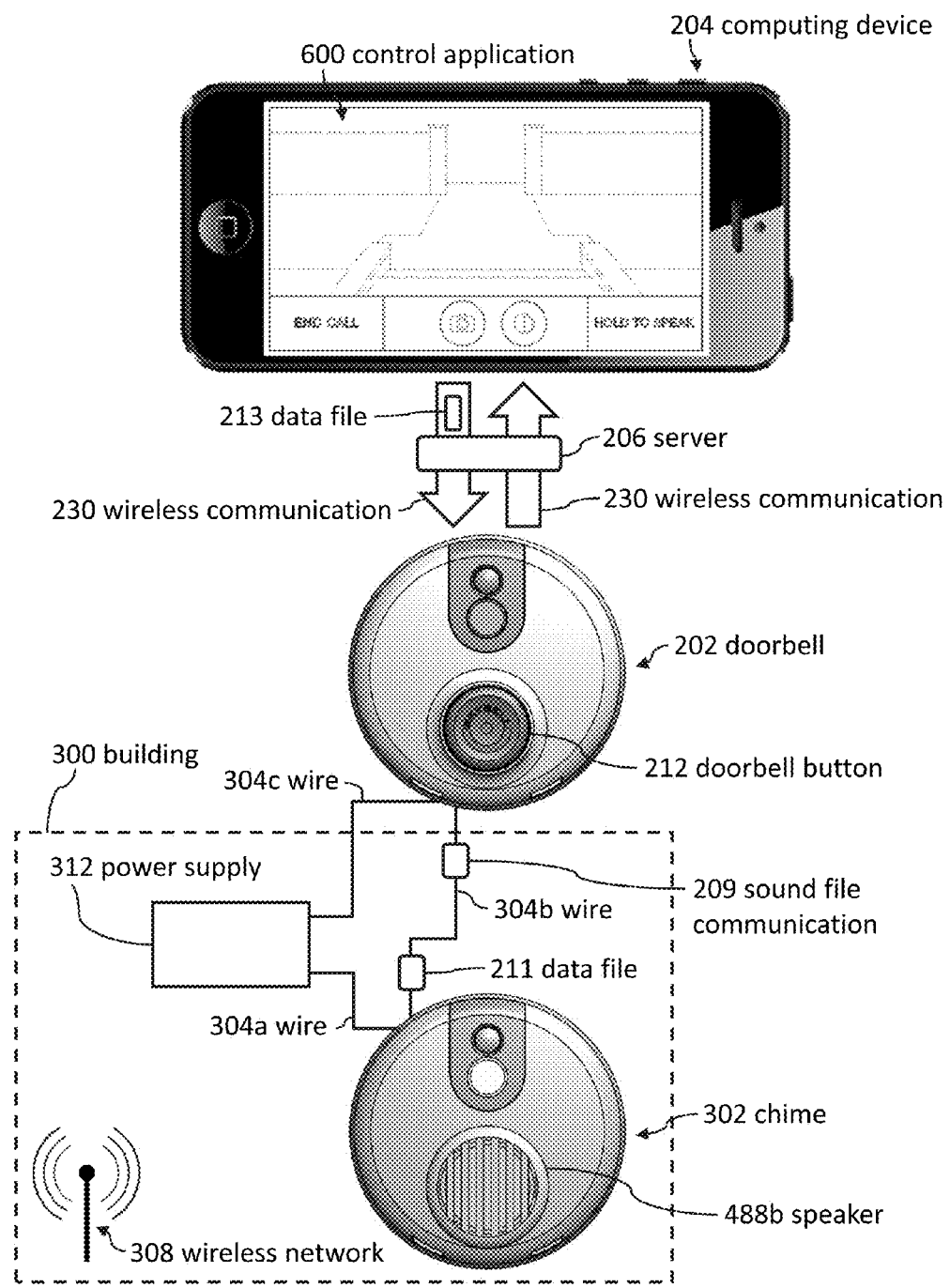
Figure 10:
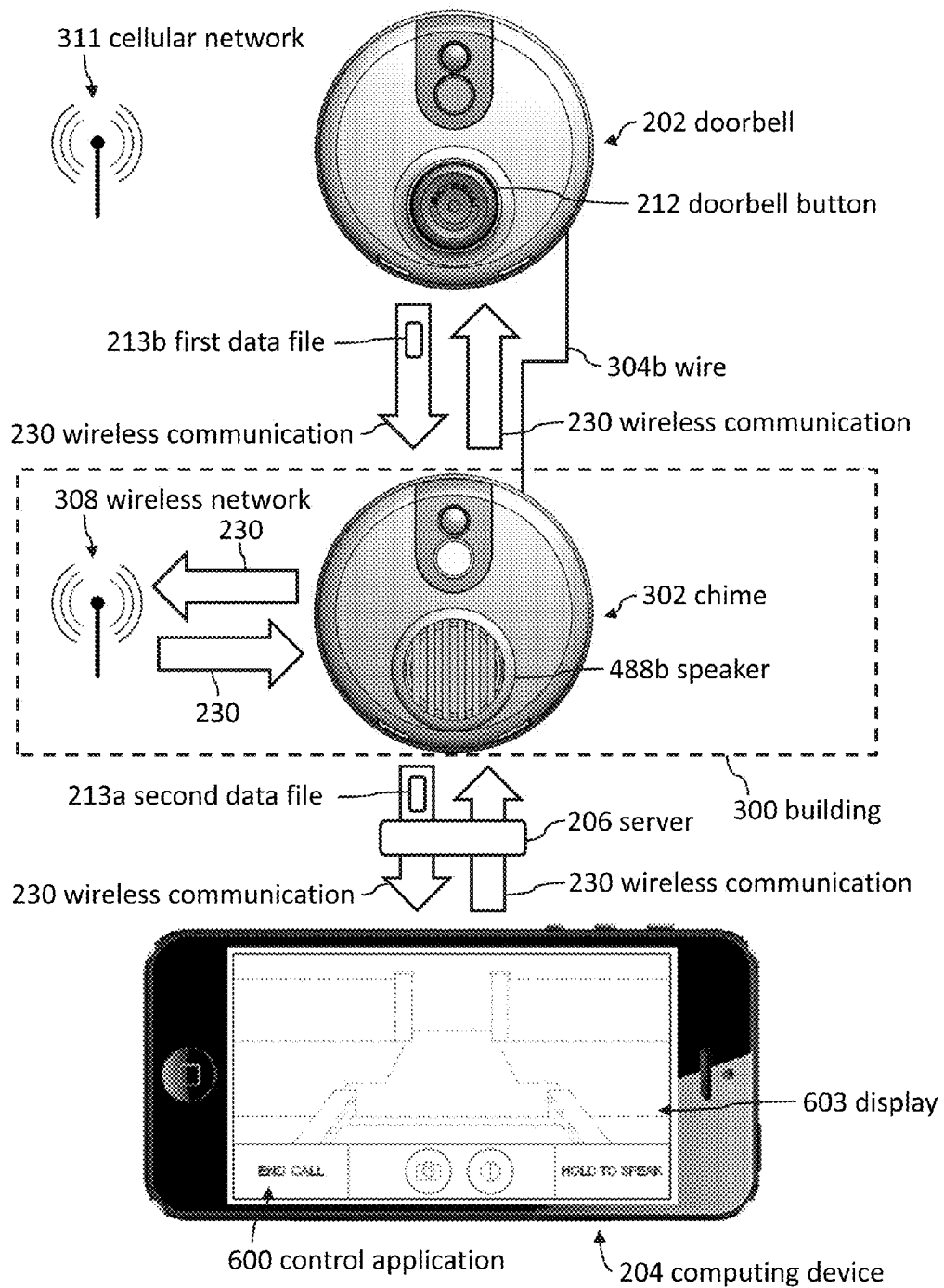
Figure 11:
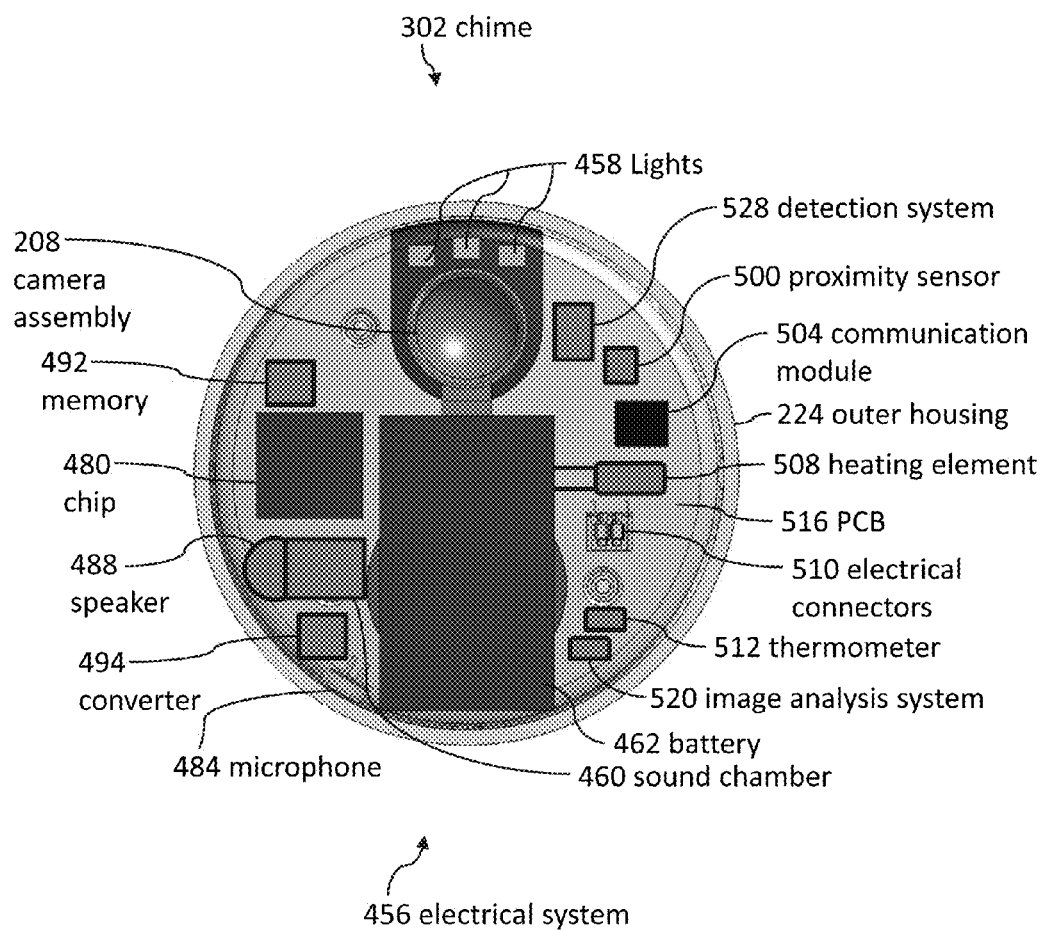
FIG. 11 illustrates a back view of a chime without a back cover to show various components of the chime's electrical system, according to some embodiments.

FIG. 4 illustrates an internal view of the doorbell 202. Doorbells 202 can include a chip 480 (e.g., integrated circuits, microprocessor, computer) and a memory 492. Doorbells 202 can also include a microphone 484 and a speaker 488. The speaker 488 can comprise a flat speaker and a sound chamber 460 configured to amplify an emitted sound. The flat speaker can be located in the sound chamber. Some doorbell embodiments include a proximity sensor 500. In several embodiments, doorbells 202 include a wireless communication module 504, such as a WiFi module. The communication module 504 can have an integrated antenna. In some embodiments, an antenna is contained within the outer housing 224.

The doorbell 202 can include one or more heating elements 508 configured to regulate the temperature of the doorbell 202. For example, doorbells 202 can be used in very cold environments, such as in Alaska. The heating element 508 can be used in various methods to protect temperature sensitive portions of the doorbell 202 from cold weather.

While protecting the doorbell 202 from cold weather can be important in some embodiments, protecting visitors from excessive heat can also be important in some embodiments. Excessive heat could burn visitors as they "ring" the doorbell (e.g., press the doorbell button 212 shown in FIG. 1). The doorbell 202 can include a thermometer 512 to enable the system to determine the temperature inside a portion of the doorbell 202 and/or outside the doorbell 202.

Several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the doorbell 202. The power conversion can convert between AC and DC, change the voltage, and/or change the frequency. The converter 494 can include a transformer and/or a voltage regulator. In several embodiments, the converter 494 can include a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, the rectifier, the proximity sensor 500, the communication module 504, the heating element 508, the electrical connectors 510, the thermometer 512, the image analysis system 520, and the battery 462) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

In some embodiments, the user interface can include an area for displaying an advertisement 258.

The doorbell 202 can include a detection system 528. The doorbell 202 may be configured to alert the user to the presence of a visitor 388 by, for example, sounding a chime 302.

Although some embodiments are described in the context of methods, the method embodiments can also be formulated as devices and systems. Methods described herein can be applied to the devices and systems incorporated by references herein.

Chime Silencing Embodiments

The entire contents of the following application are incorporated by reference herein: U.S. Nonprovisional patent application Ser. No. 14/724,723; filed May 28, 2015; and entitled DOORBELL CHIME SYSTEMS AND METHODS. FIGS. 5-11 herein are described in U.S. patent application Ser. No. 14/724,723 as FIGS. 31-37, which include chime embodiments.

Doorbell chimes are often loud and may interfere with a person's sleep. This sleep interruption is often especially hard on babies and small children who may be napping during the day when visitors would most likely ring the doorbell. A doorbell system that allows the chime to be turned off or down while a person (baby, child, or adult) is asleep may help that person get a better quality of sleep.

Figure 12:
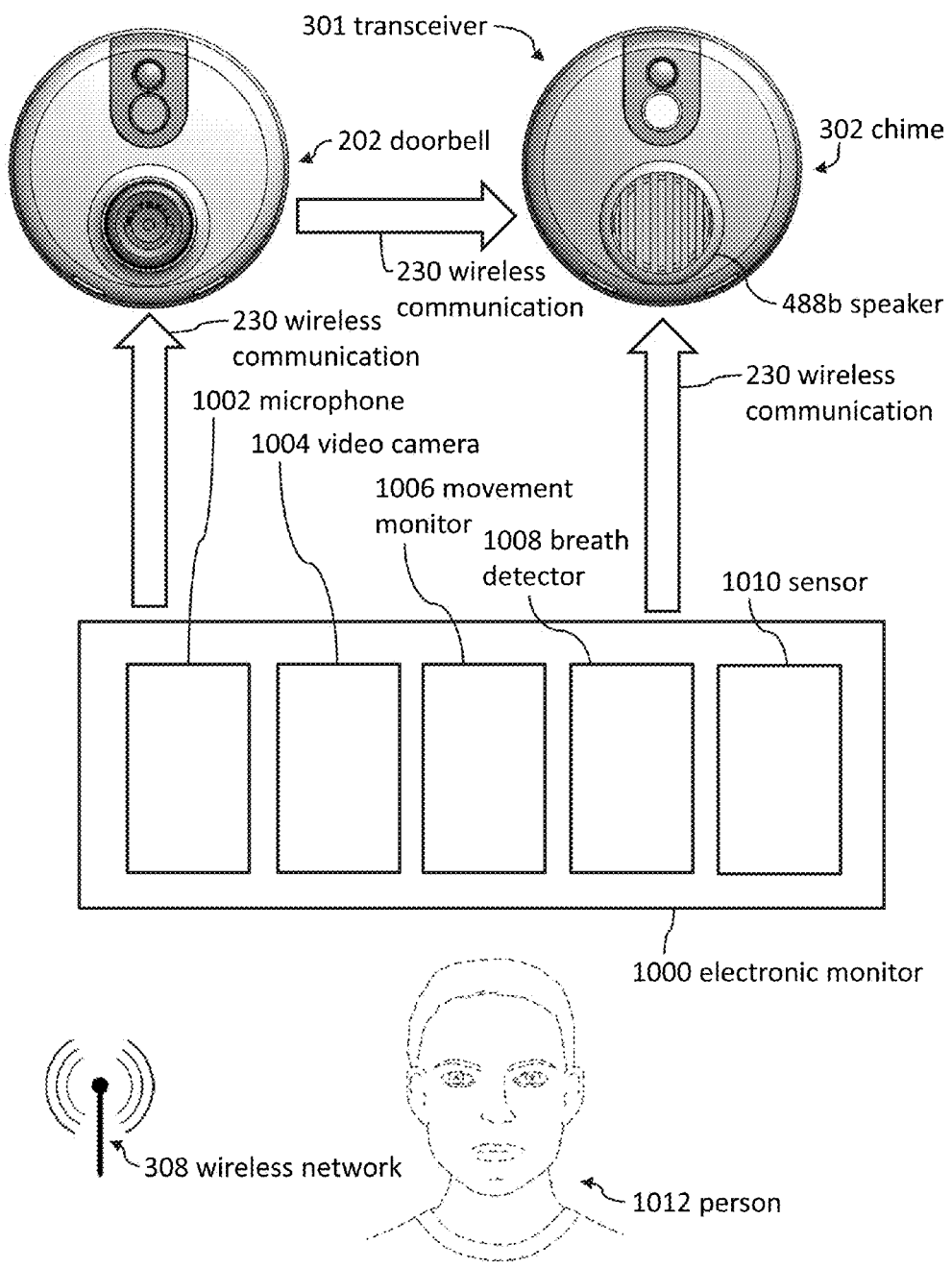
FIG. 12 illustrates a diagrammatic view of a doorbell chime system according to some embodiments.

Referring now to FIG. 12, a doorbell chime system may include, among other things, an electronic monitor 1000, a doorbell 202, and a transceiver 301. Electronic monitors 1000 (e.g., baby monitors) can detect whether a person 1012 (e.g., a baby) is sleeping. The electronic monitor 1000 can include a microphone 1002 (e.g., to listen for breathing indicative of sleep), a video camera 1004 (e.g., to watch for a lack of motion, a sleeping position, or other behavior indicative of sleep), an under-mattress movement monitor 1006 (e.g., to detect whether a person is located in a bed and/or to detect movement behavior indicative of sleep), a breath monitor 1008 (e.g., to detect breathing indicative of sleep), and/or other sensors 1010 configured to determine whether a person 1012 is asleep.

Electronic monitors 1000 can be activity trackers such as the Jawbone UP2 made by Jawbone Inc., which has an office in San Francisco, Calif. Electronic monitors 1000 can also be Apple Watches made by Apple Inc., which has an office in Cupertino, Calif. Jawbone UP2 and an Apple Watch can determine whether the person to which they are attached is asleep.

Electronic monitors 1000 can also be motion detectors configured to determine if a person is asleep. Lack of motion for over 15 minutes can be indicative of a person being asleep.

Electronic monitors 1000 can also be under-mattress monitors. The Angelcare AC1100 is an example of an embodiment of an electronic monitor. The AC1100 includes a video camera, sound monitor, and an under-mattress monitor, which can be configured to detect whether a person is asleep. The AC1100 is made by Angelcare Monitors Inc., which has an office in Candiac, Quebec, Canada.

The Mimo Smart Baby Movement Monitor is an example of an electronic monitor 1000. The Mimo is made by Rest Devices, Inc., which has an office in Boston, Mass.

The Spoutling is an example of an electronic monitor 1000. The Spoutling company has an office in San Francisco, Calif.

The Owlet is an example of an electronic monitor 1000. The Owlet is made by Owlet Baby Care, which has an office in Provo, Utah.

There are many different ways to detect whether a person is asleep. For example, a motion detection system can determine that a person is sleeping if the person does not move. A radar system can sense breathing patterns indicative of sleeping. An activity tracker can detect sleeping due to accelerations indicative of sleeping or simply via detecting a lack of movement. A camera can watch a person to see if the person is sleeping (e.g., via a lack of movement or being located in a bed). The motion detection system could be part of a baby monitoring device (i.e. a device worn by the baby). Alternatively a doorbell system can include a button for a user to indicate that a person is sleeping.

The electronic monitor 1000 can be located inside a building (e.g., inside a bedroom, near a baby's crib). The chime 302 can be located inside the same building. The doorbell 202 can be coupled to an exterior surface of the building (e.g., near an entryway). The electronic monitor 1000, the doorbell 202, and/or the chime 302 can be communicatively coupled (e.g., via wireless communications 230).

The electronic monitor 1000, the doorbell 202, and/or the chime 302 can be connected to the same wireless network 308. In some embodiments, the electronic monitor 1000, the doorbell 202, and/or the chime 302 are communicatively coupled (to enable communication between them), but are not connected to the same wireless network 308.

If the doorbell 202 detects a visitor (e.g., a visitor pushes the button of the doorbell 202), the doorbell 202 can send a signal (which can be data or simply electricity) to a transceiver 301 (e.g. a chime 302). The chime 302 can emit a notification sound in response to receiving the signal from the doorbell 202.

If the person 1012 is asleep inside the building 300 (shown in FIG. 3) to which the doorbell 202 and/or the transceiver 301 is attached, then the system can automatically modify the notification sound emitted by the chime 302 or turn off the chime 302. Modifying the notification sound could include blocking the chime 302 from emitting the notification sound or reducing the volume of the notification sound, among other things. Once the system detects that the person 1012 is no longer sleeping, then the system can be configured to automatically modify the notification sound emitted by the chime 302 or turn on the chime 302. Modifying the notification sound emitted by the chime 302 may include enabling the chime 302 to emit the notification sound or turning up the volume of the notification sound. In some embodiments once the system detects that the person 1012 is no longer sleeping, the system can be configured to cause the chime 302 to emit a second notification sound.

In some embodiments, the system disables emitting notification sounds in response to the electronic monitor 1000 detecting that a baby is asleep. In several embodiments, the system blocks emitting notification sounds in response to the electronic monitor 1000 detecting that an adult is asleep.

The electronic monitor 1000 (e.g., a sleep detection system) can detect if a person 1012 (e.g., a baby) is asleep. The sleep detection system 1000 can communicate directly via wireless communication 230 with the doorbell chime 302 to configured the chime 302 to not emit the notification sound (so the chime does not emit a notification sound from the speaker 488*b*). In some embodiments, the sleep detection system 1000 communicating with the doorbell chime 302 comprises the sleep detection system 1000 sending a modifying signal to the doorbell chime 302.

In some embodiments, the sleep detection system 1000 cannot communicate directly with the chime 302. In some embodiments, the sleep detection system 1000 communicates with the doorbell 202 (which includes a camera) and/or with a communication hub 314 via wireless communication 230. Then, the doorbell 202 or the communication hub 314 can send a wireless communication 230 (i.e. a modifying signal) to the chime 302 to configure the chime 302 to not emit the notification sound or lower the volume of the notification sound. A communication hub 314 may be configured to receive signals (e.g., wireless communication 230) from other components of the doorbell system (i.e., the doorbell 202, the chime 302, or the electronic monitor 1000).

Figure 13:
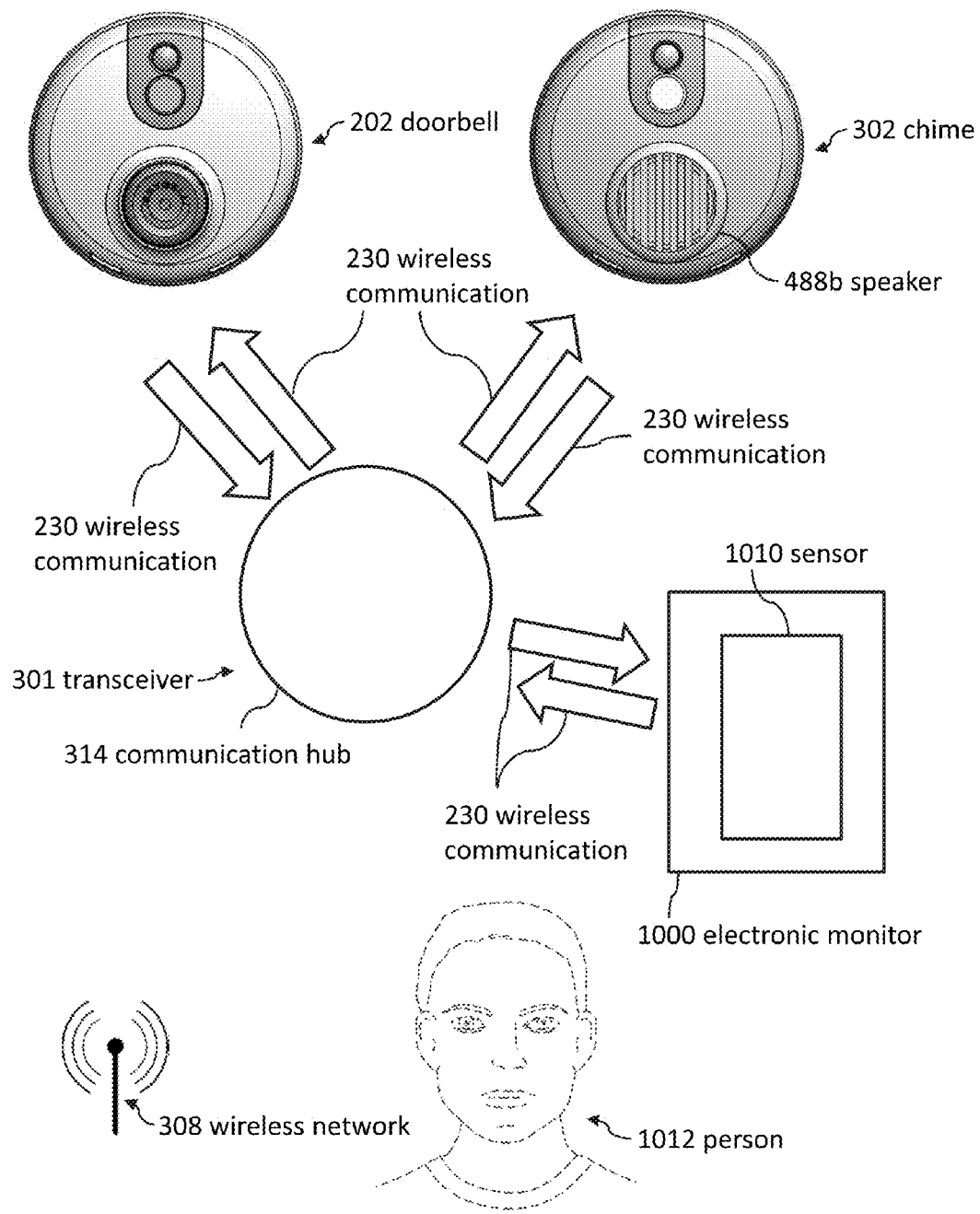
FIG. 13 illustrates a diagrammatic view of a doorbell chime system according to some embodiments.

Referring now to FIG. 13, in some embodiments the transceiver 301 may be a communication hub 314. The communication hub 314 may be communicatively coupled to the other components of the doorbell system (i.e. doorbell 202, doorbell chime 302, and electronic monitor 1000). The communication hub 314 may enable communication between different parts of the doorbell chime system. For example, in some embodiments the doorbell 202, doorbell chime 302, and electronic monitor may be communicatively coupled to the communication hub 314, but not to each other. In some embodiments the doorbell 202, doorbell chime 302, and electronic monitor 1000 can communicate only with the communication hub 314. For example, the doorbell 202 may send a signal to the communication hub 314 in response to detecting a visitor. Then, the communication hub may send a signal to the doorbell chime 302 to cause the doorbell chime 302 to emit a notification sound. The communication hub 314 may also receive a signal from the electronic monitor 1000 in response to the electronic monitor 1000 detecting that a person 1012 is asleep. In response to the communication hub 314 receiving a signal from the electronic monitor 1000 that a person is asleep, the communication hub may send a signal to the doorbell chime 302 to modify the notification sound emitted by the doorbell chime 302. In some embodiments the transceiver 301 may be the doorbell 202.

In order to modify the notification sound emitted by the doorbell chime 302 a modifying signal may be sent to the doorbell chime in response to the doorbell 202 receiving the first signal.

In some embodiments, the sensor 1010 can be a radar detector configured to sense a person's breathing. In response to detecting that the person 1012 is not breathing, the system can notify a third party (e.g., police, emergency services, ambulance dispatch, a relative). Not breathing could be a sign of cardiac arrest, so the system can be a cardiac-arrest detection system.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub combinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for using a doorbell chime system comprising a doorbell, a doorbell chime, an electronic monitor, and a communication hub located remotely from the doorbell chime, the method comprising:
   detecting, by the electronic monitor, that a person is asleep;
   receiving a first signal, by the communication hub, in response to the electronic monitor detecting that the person is asleep;
   decreasing, by the system, a volume of a first notification sound emitted by the doorbell chime in response to detecting, by the electronic monitor, that the person is asleep, wherein the decreased volume is greater than 0 decibels;
   sending, by the communication hub, a modifying signal to at least one of the doorbell and the doorbell chime in response to the communication hub receiving the first signal; and
   blocking, by at least one of the doorbell and the doorbell chime, the first notification sound in response to at least one of the doorbell and the doorbell chime receiving the modifying signal.

2. The method of claim 1, wherein the system comprises a button configured to trigger the doorbell chime to emit the first notification sound, wherein modifying the first notification sound emitted by the doorbell chime comprises disabling the button of the doorbell such that pressing the button does not cause the doorbell chime to emit the first notification sound.

3. The method of claim 1, further comprising modifying, by the system, the first notification sound emitted by the doorbell chime in response to the transceiver of the doorbell chime receiving the first signal.

4. The method of claim 1, further comprising blocking, by the doorbell, the doorbell chime from emitting the first notification sound.

5. The method of claim 4, wherein decreasing the first notification sound emitted by the doorbell chime comprises:
   sending, by the doorbell, a modifying signal to the doorbell chime in response to the doorbell receiving the first signal; and
   blocking, by the doorbell chime, the first notification sound in response to receiving the modifying signal.

6. The method of claim 1, further comprising modifying, by the system, the first notification sound emitted by the doorbell chime in response to at least one of the doorbell and the doorbell chime receiving the first signal.

7. A doorbell system comprising:
   a doorbell;
   a doorbell chime communicatively coupled to the doorbell, the doorbell chime configured to emit a first notification sound in response to receiving a visitor indication from the doorbell;
   a communication hub communicatively coupled to the doorbell and the doorbell chime, the communication hub located remotely from the doorbell and the doorbell chime; and
   a sleep detection system communicatively coupled to the communication hub, the sleep detection system having a sensor configured to determine whether a person is asleep, wherein in response to the sleep detection system determining that the person is asleep, the doorbell chime is configured to modify the first notification sound emitted by the doorbell chime and the doorbell system is configured to decrease a volume of the first notification sound emitted by the doorbell chime such that the decreased volume is greater than 0 decibels; and
   a wireless communication from the sleep detection system to configure the doorbell system to prevent the doorbell chime from emitting the first notification sound,
   wherein the communication hub is configured to send a modifying signal to at least one of the doorbell and the doorbell chime, and wherein at least one of the doorbell and the doorbell chime is configured to block the first notification sound in response to at least one of the doorbell and the doorbell chime receiving the modifying signal.

8. A doorbell system comprising:
   a doorbell;
   a doorbell chime communicatively coupled to the doorbell, the doorbell chime configured to emit a first notification sound in response to receiving a visitor indication from the doorbell;
   a communication hub communicatively coupled to the doorbell and the doorbell chime, the communication hub located remotely from the doorbell and the doorbell chime;
   a sleep detection system having a sensor configured to determine whether a person is asleep, wherein in response to the sleep detection system determining that the person is asleep, the doorbell chime is configured to modify the first notification sound emitted by the doorbell chime and the doorbell system is configured to decrease a volume of the first notification sound emitted by the doorbell chime in response to detecting, by the sensor, that the person is asleep such that the decreased volume is greater than 0 decibels; and
   a remote computing device communicatively coupled to at least one of the doorbell chime and the sleep detection system, wherein in response to the sleep detection system determining that the person is asleep, the remote computing device is configured to modify a second notification sound emitted by the remote computing device,
   wherein the communication hub is configured to send a modifying signal to at least one of the doorbell and the doorbell chime, and wherein at least one of the doorbell and the doorbell chime is configured to block the first notification sound in response to at least one of the doorbell and the doorbell chime receiving the modifying signal.

9. The doorbell system of claim 8, wherein the doorbell system is further configured to, in response to the sleep detection system determining that the person is awake, modify the first notification sound emitted by the doorbell chime.

10. The doorbell system of claim 9, wherein modifying the first notification sound emitted by the doorbell chime includes enabling the first notification sound.

11. The doorbell system of claim 9, wherein modifying the first notification sound emitted by the doorbell chime includes increasing the volume of the first notification sound.

12. The doorbell system of claim 8, wherein modifying the first notification sound emitted by the doorbell chime includes blocking the first notification sound.

13. The method of claim 1, further comprising modifying, by the system, a second notification sound emitted by a remote computing device in response to detecting, by the electronic monitor, that the person is asleep, wherein the remote computing device is communicatively coupled to the doorbell chime.

14. The doorbell system of claim 7, further comprising a remote computing device communicatively coupled to at least one of the doorbell, doorbell chime, and the sleep detection system, wherein in response to the sleep detection system determining that the person is asleep, the remote computing device is configured to modify a second notification sound emitted by the remote computing device.

15. The doorbell system of claim 14, further comprising a wireless communication from the sleep detection system to configure the doorbell system to prevent the doorbell chime from emitting the first notification sound and the remote computing device from emitting the second notification sound.

16. The doorbell system of claim 8, wherein the remote computing device comprises a smart phone.

17. The doorbell system of claim 8, wherein the remote computing device comprises an electronic tablet device.

18. The method of claim 13, further comprising:
detecting, by the electronic monitor, that the person is awake;
receiving a second signal, by the transceiver, in response to the electronic monitor detecting that the person is awake; and
modifying, by the system, a third notification sound emitted by the doorbell chime in response to detecting, by the electronic monitor, that the person is awake.

19. The method of claim 18, wherein modifying the third notification sound emitted by the doorbell chime comprises increasing the volume of the notification sound.

20. The method of claim 18, wherein modifying the third notification sound emitted by the doorbell chime comprises enabling the third notification sound.

21. The doorbell system of claim 15, wherein the doorbell system, in response to the sleep detection system determining that the person is awake, is configured to modify the first notification sound emitted by the doorbell chime.

* * * * *